United States Patent
Liu et al.

(10) Patent No.: US 11,215,963 B2
(45) Date of Patent: *Jan. 4, 2022

(54) TRACING APPARATUS AND PROGRAMMABLE CONTROLLER

(71) Applicant: FANUC CORPORATION, Yamanashi (JP)

(72) Inventors: Kun Liu, Yamanashi (JP); Mitsuru Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

This patent is subject to a terminal disclaimer.

(21) Appl. No.: 16/587,985

(22) Filed: Sep. 30, 2019

(65) Prior Publication Data

US 2020/0142379 A1 May 7, 2020

(30) Foreign Application Priority Data

Nov. 7, 2018 (JP) .............................. JP2018-209532

(51) Int. Cl.
*G05B 19/05* (2006.01)

(52) U.S. Cl.
CPC .. *G05B 19/056* (2013.01); *G05B 2219/13052* (2013.01); *G05B 2219/13142* (2013.01); *G05B 2219/13144* (2013.01)

(58) Field of Classification Search
USPC .......................................................... 700/18
See application file for complete search history.

(56) References Cited

U.S. PATENT DOCUMENTS

| 5,237,652 A * | 8/1993 | McManus ............ G05B 19/056 700/18 |
| 2002/0059567 A1* | 5/2002 | Minamide ................. G06F 8/51 717/151 |
| 2006/0155393 A1* | 7/2006 | Klein ................... G05B 19/056 700/18 |
| 2015/0301923 A1* | 10/2015 | Yamaoka ............... G05B 19/05 714/38.1 |
| 2017/0075341 A1* | 3/2017 | Nagashima ........ G05B 19/4145 |

(Continued)

FOREIGN PATENT DOCUMENTS

| JP | 8-305418 | 11/1996 |
| JP | 5362148 | 12/2013 |
| JP | 5649748 | 1/2015 |

*Primary Examiner* — Md Azad
(74) *Attorney, Agent, or Firm* — Wenderoth, Lind & Ponack, L.L.P.

(57) ABSTRACT

A tracing apparatus that is connected to a PLC for inputting and outputting signals based on a ladder program includes: a ladder program analysis unit that analyzes an order in which nets in the ladder program are arranged so as to produce an execution order signal table indicating an order in which the nets are executed; a trace target setting unit that sets one or more nets to be traced; a trace data acquisition unit that acquires trace data in a predetermined sampling cycle; a compensation determination unit that determines, based on the table, whether or not the state (reference signal) of a signal at a contact included in a ladder circuit to be traced needs to be compensated for; and an output unit that outputs a ladder diagram of a trace result which has been compensated for based on the result of the determination of the compensation determination unit.

5 Claims, 10 Drawing Sheets

(56) References Cited

U.S. PATENT DOCUMENTS

2018/0088548 A1* 3/2018 Sangi ............... H04W 4/70
2019/0018387 A1* 1/2019 Nagao ............... G06F 11/079
2019/0236233 A1* 8/2019 Horikawa ........... G06F 30/30

* cited by examiner

1241. EXECUTION ORDER SIGNAL TABLE

| EXECUTION ORDER | POSITION INFORMATION | | REFERENCE SIGNAL | UPDATE SIGNAL |
|---|---|---|---|---|
| | PROGRAM | NET POSITION | | |
| 1 | MAIN | 1 | A | X |
| 2 | MAIN | 2 | H | – |
| 3 | P1 | 1 | C | A |
| 4 | P1 | 2 | Z | D |
| 5 | MAIN | 3 | D | Y |
| 6 | MAIN | 4 | X | – |
| 7 | P2 | 1 | Y | C |
| 8 | P2 | 2 | C | E |
| 9 | MAIN | 5 | I | B |

LADDER PROGRAM

FIRST CYCLE

SECOND CYCLE

FIG.4C

TRACE GRAPH

TRACE GRAPH
(AFTER COMPENSATION)

|   | FIRST CYCLE | SECOND CYCLE |   |   |   |   |   |   |   |   |
|---|---|---|---|---|---|---|---|---|---|---|
| X | ■ |   |   |   |   |   |   |   |   |   |
| Y | ■ |   |   |   |   |   |   |   |   |   |
| A | ■ |   |   |   |   |   |   |   |   |   |
| B |   | ■ |   |   |   |   |   |   |   |   |
| C |   | ■ |   |   |   |   |   |   |   |   |

FIG.4F

AFTER
COMPENSATION

SECOND CYCLE

SAMPLING PROCESSING

TRACE GRAPH

LADDER DIAGRAM (SECOND CYCLE)

TRACING APPARATUS AND PROGRAMMABLE CONTROLLER

This application is based on and claims the benefit of priority from Japanese Patent Application No. 2018-209532, filed on 7 Nov. 2018, the content of which is incorporated herein by reference.

BACKGROUND OF THE INVENTION

Field of the Invention

The present invention relates to a tracing apparatus of a sequence control program and a programmable controller.

Related Art

Figure 2:
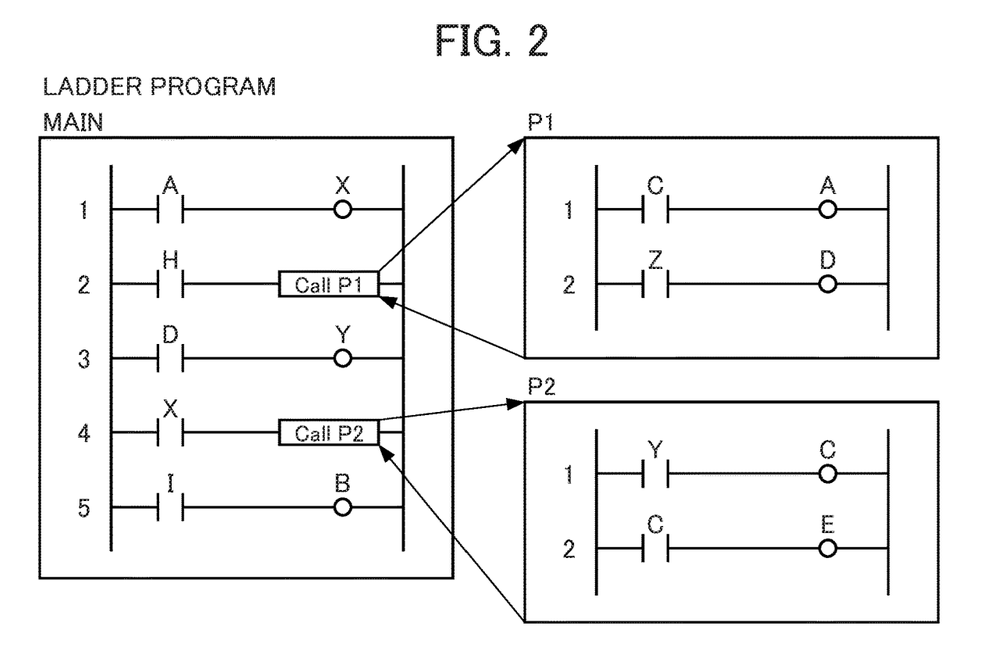
FIG. 2 is a diagram showing an example of a ladder program.

In operations of a machine, there are a large number of steps of waiting for the completion of an operation for a command and then performing the subsequent operation, and as one method of realizing such a step, waiting processing is often used in which, for example, whether the operation is being performed or the operation has been completed is determined by the state of a signal in a PLC (Programmable Logic Controller) (hereinafter also referred to as a "programmable controller") and in which thus the operation is transferred to the subsequent operation. The programmable controller performs control on a target to be controlled according to a sequence program. For example, the sequence program is represented in the form of a ladder diagram (which is referred to as a "ladder program") as illustrated in FIG. 2, a contact indicates the waiting of a signal state, a coil can indicate the drive of a load, the output of a signal or the like and tame waiting processing using a timer circuit or the like can also be performed.

In general, whether or not control which is expected can be performed with the ladder program (sequence program) is debugged with a debugging apparatus (see, for example, patent documents 1, 2 and 3. A method is known in which when a phenomenon unexpected to a user occurs in the operation of the programmable controller, a trace function provided by a tracing apparatus or the programmable controller is used so as to investigate a signal causing the phenomenon. In the trace function, a trace sampling cycle is present, and, for example, in patent document 3, a function is provided which displays, when a cursor is set at an arbitrary time corresponding to the trace sampling cycle of a signal to be traced, a ladder diagram corresponding to the sampling cycle (time) thereof.

Patent Document 1: Japanese Patent No. 5362148
Patent Document 2: Japanese Unexamined Patent Application, Publication No. H08-305418
Patent Document 3: Japanese Patent No. 5649748

SUMMARY OF THE INVENTION

A trace sampling cycle is generally synchronous with the execution cycle of a ladder program. Pence, for a signal to be traced, a signal immediately after the execution of the ladder program (at the time of the execution cycle) including a net in which the signal is written is displayed as a signal at a time corresponding to the trace sampling cycle. For example, in a case where the state (hereinafter also referred to as a "reference signal") of a signal at a contact to be referenced in a net in which a signal (hereinafter also referred to an "update signal") of a coil to be traced is present is written in another net after the execution of the net described above, when a trace sampling result at the time corresponding to the trace sampling cycle (ladder program execution cycle) is seen, a contradiction may occur in a relationship between the contact (reference signal) and the coil (update signal) within the net to be traced.

Figure 4A:
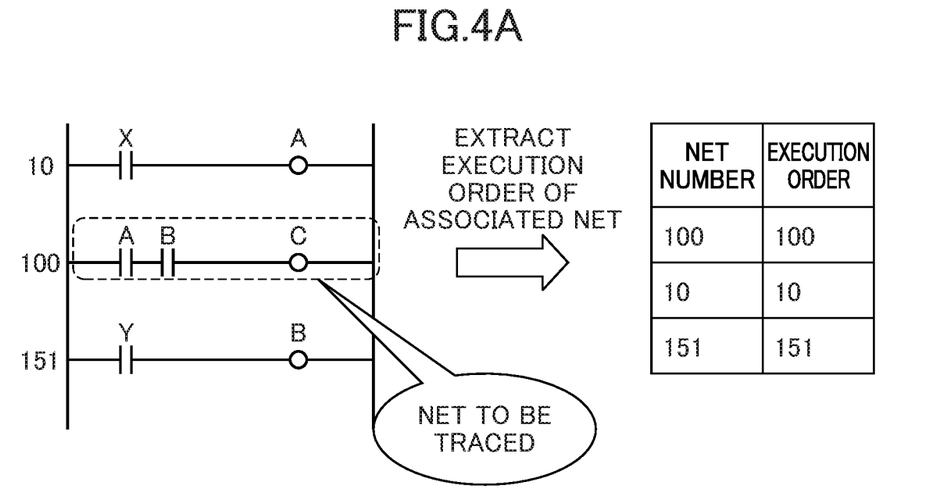
FIG. 4A is a diagram showing an example of the position information (net numbers) and the execution order numbers of nets in which the states of signals at individual contacts are written on all contacts in the nets to be traced.
Figure 4B:
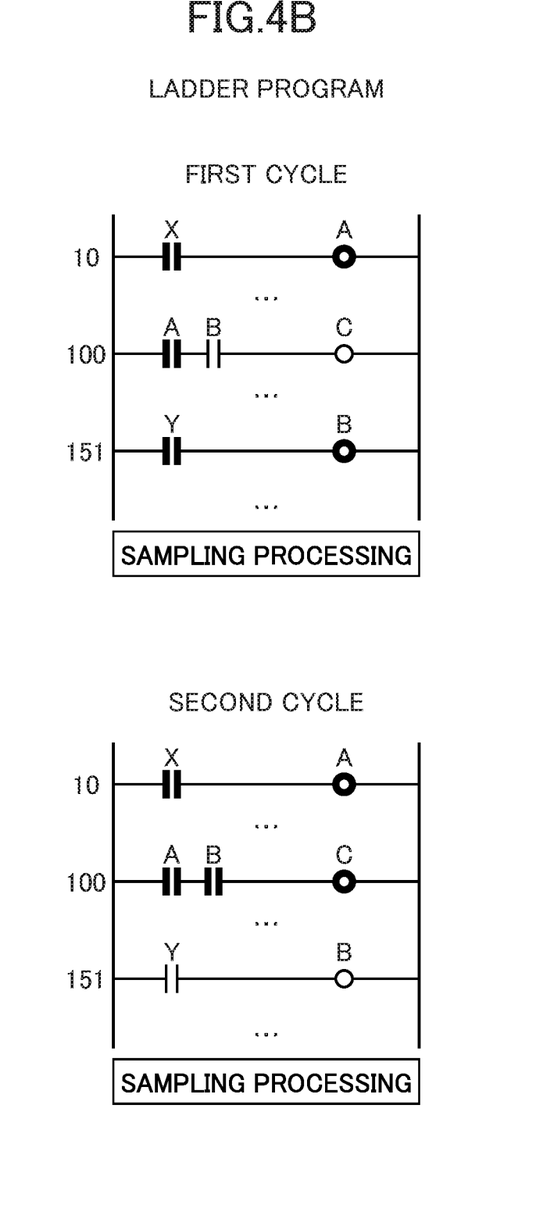
FIG. 4B is a diagram showing the trace results of the first cycle and the second cycle in trace sampling cycles (ladder program execution cycles)
Figure 4C:
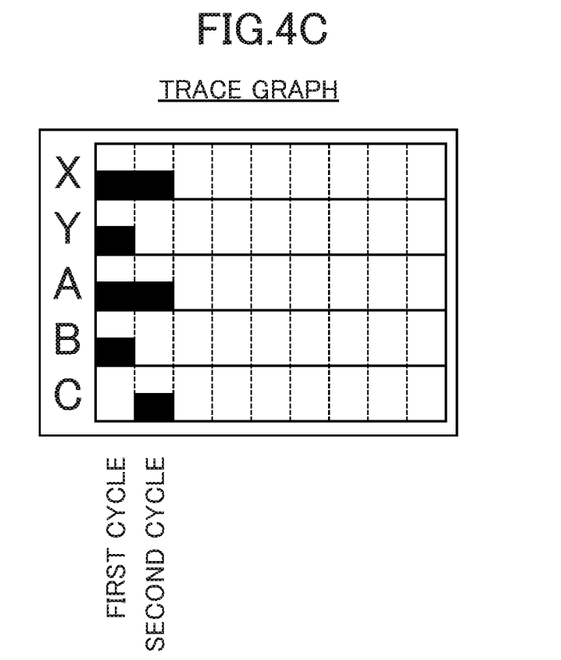
FIG. 4C is a diagram showing an example of a trace graph.
Figure 4D:
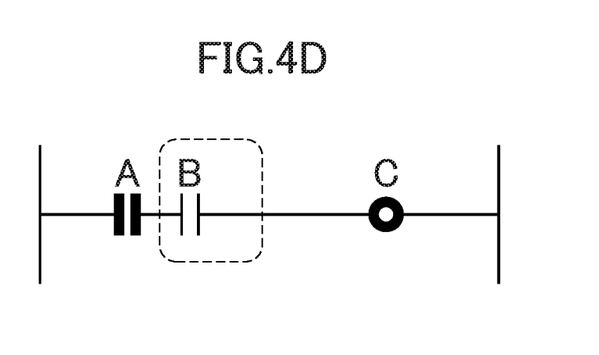
FIG. 4D is a diagram showing an example of a ladder diagram before the compensation of a net to be traced.

How a contradiction occurs will be specifically described with reference to FIGS. 4A to 4D. FIG. 4A illustrates a ladder program and an execution order signal table. FIG. 4B shows the trace results of the first cycle and the second cycle in trace sampling cycles. FIG. 4C shows a trace graph which indicates the states of individual signals in the first and second cycles. FIG. 4D shows a ladder diagram for a net number 100 in the second cycle. As shown in FIGS. 4B and 4C, when the net of the net number 100 is executed in the second cycle, since both A and B serving as reference signals are on, a signal C to be traced is turned on. However, since the net of the net number 100 is executed and thereafter the net of a net number 151 is executed, a signal B is turned off. Hence, when the trace result of the net number 100 at a time corresponding to the trace sampling cycle (the execution cycle of the ladder program) of the second cycle is displayed as a ladder diagram, as illustrated in FIG. 4D, a contradiction occurs in a relationship between the state (reference signal) of the signal at a contact B and the state (update signal) of the signal of a coil C. As described above, in a complicated ladder program, for example, in a case where the state of a signal at a contact to be referenced in a net in which a coil to be traced is present is updated (written) in another net after the execution of the net described above, when based on the state of a signal at the time of the trace sampling cycle (the execution cycle of the ladder program), the state of the signal in the net described above is displayed in a ladder diagram, a contradiction may occur as in the illustrated ladder program. Then, a user needs to grasp a relationship between the change of the signals and the execution order of the ladders. However, it is difficult for the user to grasp, in the complicated ladder program, the relationship between the change of the signals and the execution order of the ladders.

In this respect, patent document 3 discloses that in the display screen of a debug support program in a PLC, in the upper half of the display screen 100, a circuit monitor display region 110 for displaying a user program is provided, in the lower half, a trend graph display region 120 for displaying a trend graph is provided and the value of a device on a circuit monitor display is displayed in the circuit monitor display region 110 together with the movement, of a cursor on the trend graph in the lower half. However, patent document 3 neither discloses nor suggests the problem described above and countermeasures therefor, and when in a complicated ladder program, a ladder diagram of a net to be traced corresponding to a trace sampling cycle is displayed, a contradiction may occur as in the illustrated ladder program.

An object of the present invention is to provide a tracing apparatus which can display a signal state immediately after the execution of a ladder circuit of a constituent element (for example, a net or a coil) to be traced or a programmable controller which has a trace function.

(1) The present invention relates to a tracing apparatus (for example, a "tracing apparatus 100" which will be described later) which is connected to a programmable controller (for example, a "PLC 400" which will be described later) for executing a ladder program including a plurality of ladder circuits so as to be able to communicate therewith, the tracing apparatus (100) which is connected to a programmable controller (400) for executing a ladder program including a plurality of ladder circuits so as to be able to communicate therewith, the tracing apparatus includes: a trace target setting unit (for example, a "trace target setting unit 112" which will be described later) that sets one or more constituent elements (for example, "nets" or "coils" which will be described later) to be traced when the ladder program is executed; a ladder program analysis unit (for example, a "ladder program analysis unit 111" which will be described later) that analyzes an order in which the ladder circuits are executed; an output unit (for example, an "output unit 115" which will be described later) that outputs a ladder diagram of the ladder circuits of the constituent elements to be traced in a specified execution cycle of the ladder program; and a compensation determination unit (for example, a "compensation determination unit 114" which will be described later) that determines, based on an execution order in which the ladder circuits of the constituent elements to be traced are executed and an execution order in which the states of signals at contacts included in the ladder circuits are updated, whether or not the state of the signal at the contact included in the ladder circuit needs to be compensated for and when the compensation determination unit determines that the state of the signal at the contact included in the ladder circuit needs to be compensated for, the output unit outputs the ladder diagram in which the state of the signal at the contact included in the ladder circuit is compensated for based on a trace result in an execution cycle immediately preceding the execution cycle.

(2) In the tracing apparatus described in (1), the output unit further chronologically may output a trace result including the states of all signals included in the ladder circuits of the constituent elements to be traced in the execution cycle of the ladder program.

(3) In the tracing apparatus described in (1) or (2), the output unit may output to a display unit (for example, a display unit 140 which will be described later).

(4) In the tracing apparatus described in (3), the output unit may output, to the display unit, the ladder diagram of the ladder circuits of the constituent elements to be traced in the specified execution cycle of the ladder program.

(5) The tracing apparatus described in any one of (1) to (4) may be included in the programmable controller.

According to the present invention, it is possible to provide a tracing apparatus which can display a signal state immediately after the execution of a ladder circuit of a constituent element to be traced or a programmable controller which has a trace function.

BRIEF DESCRIPTION OF THE DRAWINGS

FIG. 4E is a diagram showing an example of the trace graph after being compensated for;

DETAILED DESCRIPTION OF THE INVENTION

First Embodiment

An outline of an embodiment of the present invention will first be described. The present embodiment relates to a tracing apparatus 100 which is connected to a PLC for inputting and outputting signals based on a ladder program so as to be able to communicate therewith, and in which even in a case where the state (signal to be referenced) of a signal at a contact included in a ladder circuit, of a constituent element (net) to be traced is written, after the execution of the ladder circuit, by a subsequent separate ladder circuit, when a ladder diagram of the ladder circuit in a trace sampling cycle is displayed, the state (signal to be referenced) of the signal at the contact is compensated for with a trace result in a cycle immediately preceding the sampling cycle such that a signal state immediately after the execution of the ladder circuit can be displayed in the following description, as the constituent element, a net is illustrated. Unless otherwise specified, in the present embodiment, the constituent element indicates the net.

Figure 1:
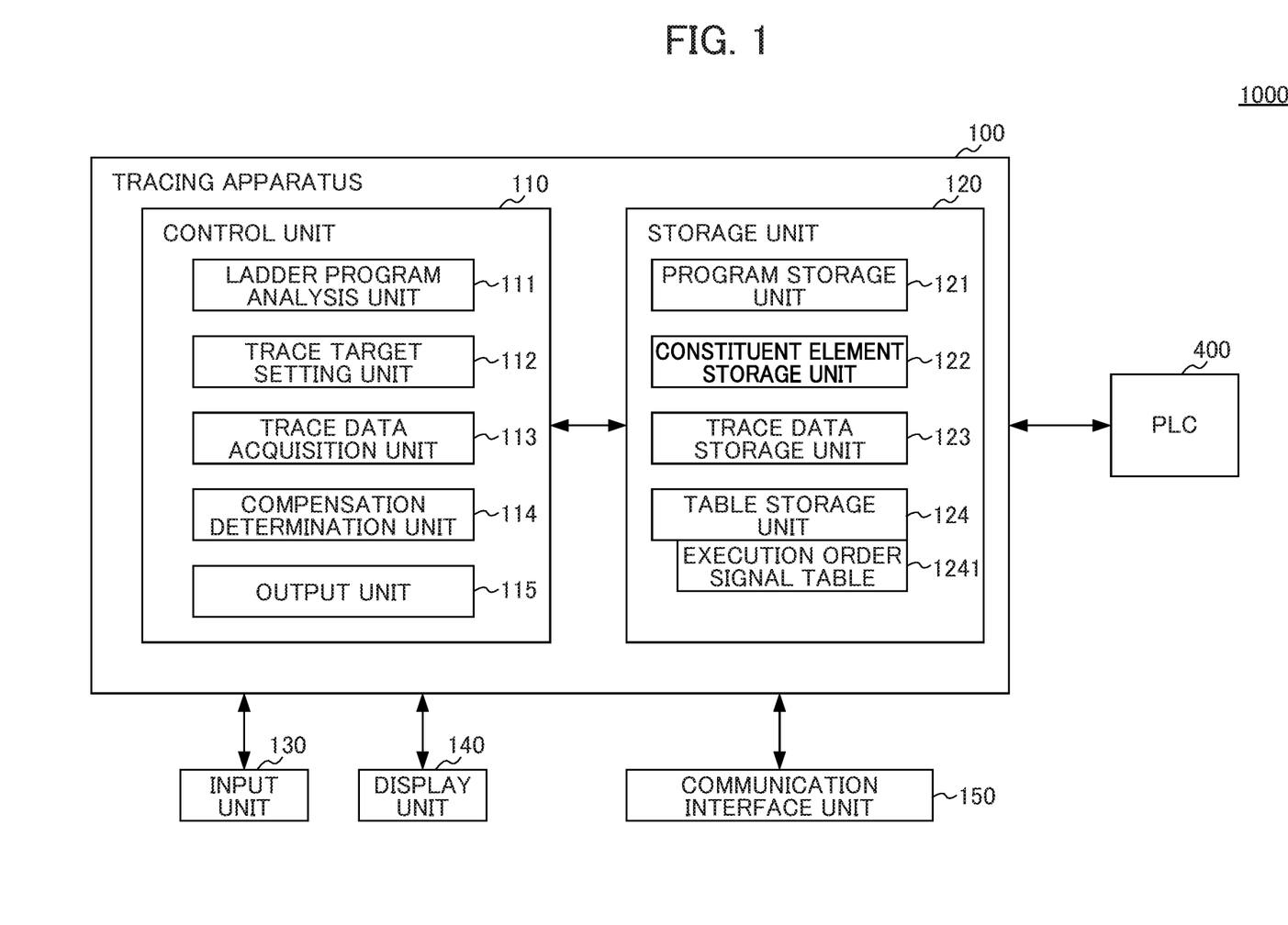
FIG. 1 is a schematic view of a basic configuration in the present embodiment and a functional block diagram of a tracing apparatus 100.

The configurations of a tracing system 1000 and the tracing apparatus 100 in the present embodiment will then be described with reference to FIG. 1. FIG. 1 is a schematic view of a basic configuration in the present embodiment and a functional block diagram of the tracing apparatus 100. As the basic configuration in the present embodiment, the tracing system 1000 shown in FIG. 1 includes the tracing apparatus 100 and the PLC (programmable controller) 400. The tracing apparatus 100 and the PLC 400 are connected through, for example, a connection interface so as to be able to communicate with each other. The tracing apparatus 100 and the PLC 400 may be connected either directly or through a network. The PLC 400 may be included in, for example, a numerical controller (not shown).

[PLC 400]

The PLC 400 is a device which executes a sequence control program such as a ladder program so as to input and output signals. Although the PLC 400 includes a CPU, a memory, a communication unit and the like for performing various types of control, operation processing and communication processing according to the ladder program, the functions thereof are known to a person skilled in the art, and thus the description and illustration thereof will be omitted.

[Tracing Apparatus 100]

When among constituent elements (nets) included in the ladder program executed in the PLC 400, one or more constituent elements to be traced are set, the tracing apparatus 100 outputs a ladder diagram of ladder circuits of the constituent elements set as the trace targets in each of the execution cycles of the ladder program. As shown in FIG. 1, the tracing apparatus 100 includes a control unit 110, a storage unit 120, an input unit 130, a display unit 140 and a communication interface unit 150. The control unit 110 is, for example, a CPU (central processing unit), and executes various types of programs which are stored in the storage unit 120 and which control the tracing apparatus 100 so as to perform overall control on the tracing apparatus 100. The details of the functions of the control unit 110 will be described later.

The storage unit 120 is a storage region in which programs and the like executed by the control unit 110 are stored. The storage unit 120 includes a program storage unit 121, a constituent element storage unit 122, trace data storage unit 123 and a table storage unit 124. The program storage unit 121 is, for example, a storage region in which programs for executing various types of functions of the control unit 110 described above are stored. The constituent element storage unit 122 is a storage region in which the constituent elements that are set as the trace targets through the input unit 130 are stored. The trace data storage unit 123 is a storage region in which trace data that is acquired is stored. The table storage unit 124 is a storage region in which an execution order signal table 1241 is stored that indicates, when the ladder program is executed, in what order the ladder circuits are executed.

The input unit 130 is, for example, an input device such as a keyboard, a mouse or various types of buttons such as switch buttons. The display unit 140 is a display device, and is formed with, for example, a CRT (Cathode Ray Tube) or an LCD (Liquid Crystal Display). A touch panel or a display unit in which the input unit 130 and the display unit 140 are integrated may be provided. The communication interface unit 150 is a communication control device which is formed with, for example, a predetermined connector such as a connector for RS232C and which is intended for directly connecting with the PLC 400.

The control unit 110 is, for example, a CPU (central processing unit), and executes various types of programs which are stored in the storage unit 120 and which control the tracing apparatus 100 so as to make the tracing apparatus 100 function as a predetermined function unit (hereinafter collectively referred to as a "trace control function unit"). The control unit 110 (trace control function unit) can display, when a ladder diagram of a net where a signal to be traced is present is displayed in an arbitrary trace sampling cycle, a signal state immediately after the execution of the net. Hence, the control unit 110 includes a ladder program analysis unit 111, a trace target setting unit 112, a trace data acquisition unit 113, a compensation determination unit 114 and an output unit 115.

[Ladder Program Analysis Unit 111]

The ladder program analysis unit 111 analyzes the order in which the ladder circuits in the ladder program are arranged, and produces, when the ladder program is executed, the execution order signal table 1241 indicating in what order (execution order) the ladder circuits are executed. The execution order signal table 1241 is stored in the table storage unit 124. FIG. 2 shows an example of the ladder program. As shown in FIG. 2, the ladder program generally includes a plurality of programs (a main program and one or more subprograms called from the main program or a subprogram). Each of the programs includes one or more nets formed with ladder circuits, a net number is provided to each of the nets and the nets are sequentially executed in ascending order of the net numbers. The ladder program analysis unit 111 sequentially analyzes the individual nets from the front of the ladder program to the end according to the execution order of the ladder circuits. The ladder program analysis unit 111 provides an execution order number to each of the nets, and records, in the execution order signal table 1241, the position information, the reference signal and the update signal of the net. Here, the position information refers to information that includes a program name to which the net belongs and a net position (for example, the net number) in the program to which the net belongs. When the ladder program is formed with one program, it is not necessary to include the program name. The reference signal means, as described previously, the name of a signal which is referenced in the net, and the update signal means the name of a signal which is updated in the net.

[Execution Order Signal Table 1241]

Figure 3:
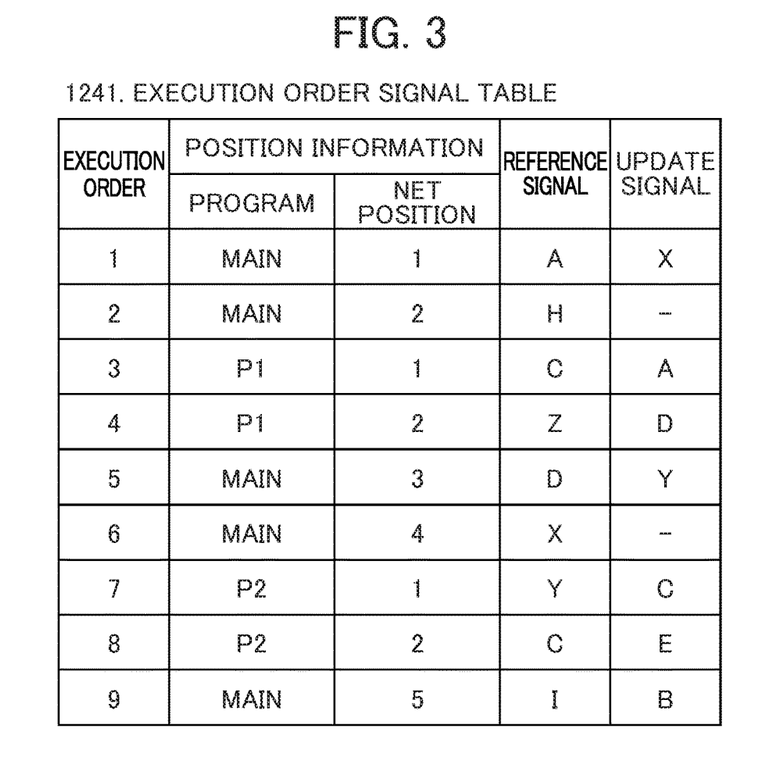
FIG. 3 is a diagram showing an example of an execution order signal table.

FIG. 3 shows an example of the execution order signal table 1241 which is produced by the analysis of the ladder program illustrated in FIG. 2 with the ladder program analysis unit 111. With reference to FIG. 3, for example, in an execution order number 3, a signal C is referenced, and a signal A is updated. Thereafter, in an execution order number 7, the signal C is found to be updated. Hence, it is found that when in the trace sampling cycle corresponding to the execution cycle of the ladder program, the ladder diagram of the net corresponding to the execution order 3 is displayed as it is, a contradiction may occur in the signal C and the signal A. The compensation determination unit 114 which will be described later references, based on the execution order signal table 1241, an execution order in which the ladder circuits of constituent elements (nets or coils) to be traced are executed and an execution order in which the states (that is, the reference signals) of signals at contacts that are included in the ladder circuits and that are referenced are updated so as to determine whether or not the state (the reference signal) of the signal at the contact included in the ladder circuit needs to be compensated for. The details of the compensation determination unit 114 will be described later.

[Trace Target Setting Unit 112]

In the trace target setting unit 112, among the constituent elements included in the ladder program executed in the PLC 400, one or more constituent elements to be traced are specified through, for example, the input unit 130 by the user. The user may specify one or more constituent elements. When the nets are specified as the constituent elements, the position information of the nets is specified. The trace target setting unit 112 references the execution order signal table 1241 so as to set, on ail the contacts (reference signals) to be referenced in the ladder circuits of the constituent elements (nets) specified as the trace targets, the nets in which the reference signals are written (updated) as the trace targets. The trace target setting unit 112 stores, in the constituent element storage unit 122, the constituent elements set as described above. Instead of specifying the constituent elements (nets) to be traced, the trace target setting unit 112 may specify coils (that is, the update signals to be updated) included in the ladder circuits of the constituent elements (nets) to be traced. In such a case, the trace target setting unit 112 may reference, for example, the execution order signal table 1241 so as to identify the position information of the constituent elements (nets) where the coils are present.

[Trace Data Acquisition Unit 113]

The trace data acquisition unit 113 acquires, in a predetermined sampling cycle, trace data which indicates, in each of the trace sampling cycles, the states of the signals of the contacts (reference signals) and the coils (update signals) included in the ladder circuits of the constituent elements (nets) to be traced. The trace data acquisition unit 113 acquires the trace data from, for example, the PLC 400. The trace data acquisition unit 113 acquires, in each of the trace sampling cycles, the states (on/off) of all the signals included in the individual constituent elements set as the trace targets. The trace data acquisition unit 113 stores, in each of the trace sampling cycles, in the trace data storage unit 123, the states of all the signals included in the individual constituent elements which are acquired in each of the trace sampling cycles. With reference to FIGS. 2 and 3, for example, when the user specifies the net number 1 of a program P1 as the trace target, the trace target setting unit 112 traces at least the net number 1 of a program P2 which updates a signal C to be referenced in the net number 1 of the program P1. With reference to FIG. 4, for example, when the user specifies the position information of the net (for example, the net number 100) as the trace target, the trace target setting unit 112 traces at least a net number 10 which updates a signal A to be referenced in the net number 100 and the net number 151 which updates the signal B to be referenced in the net number 100.

[Compensation Determination Unit 114]

When the ladder diagram of the ladder circuits of the constituent elements (nets) to be traced is output, the compensation determination unit 114 determines, based on the execution order in which the ladder circuits of the constituent elements (nets) to be traced are executed and the execution order in which the signals (reference signals) at the contacts that are included in the ladder circuits and that are referenced are updated, whether or not the signal (reference signal) at the contact that is included in the ladder circuit and that is referenced needs to be compensated for. More specifically, the compensation determination unit 114 references the execution order signal table 1241 so as to identify, on the signals (reference signals) at all the contacts that are included in the ladder circuits of the constituent elements (nets) to be traced and that are referenced, the execution order numbers of the ladder circuits in which the individual contacts (reference signals) are updated (written). A description will be given with respect to FIG. 4A. As described previously, FIG. 4A is a diagram showing an example where, on the signals (A, B) at all the contacts to be referenced in the net 100 to be traced, the position information (net numbers) and the execution order numbers of the nets which the signals at the individual contacts are written are extracted. When as shown in FIG. 4A, the net number 100 is set to the net to be traced, the contacts A and B are the reference signals. The signal at the contact A is updated by the net of the net number 10, and the signal at the contact B is updated by the net of the net number 151.

The compensation determination unit 114 compares the execution order number ($N_o$) of the ladder circuits of the constituent elements (nets) to be traced and the execution order number ($N_i$: ($1 \le i \le M$)) of the ladder circuits in which the signals (reference signals) at the individual contacts to be referenced are updated (written). Here, it is assumed that i is an index for identifying the ladder circuits in which the individual contacts (reference signals) to be referenced are updated (written) and that M is the number of ladder circuits in which the signals (reference signals) at the individual contacts to be referenced are updated (written). When formula 1 is satisfied for all is ($1 \le i \le N$), the compensation determination unit 114 determines that the compensation is not needed.

$$N_o > N_i \quad \text{(formula 1)}$$

In other words, when the signals (reference signals) at all the contacts to be referenced are updated before the ladder circuits of the constituent elements (nets) to be traced are executed, no contradiction occurs in the relationship between the signals, the compensation determination unit 114 determines that the compensation is not needed. By contrast, when is which satisfy formula 2 are present, for the signals (reference signals) at the contacts that are updated (written) by the ladder circuits corresponding to all is which satisfy formula 2, a contradiction may occur in the relationship between the signals, with the result that the compensation determination unit 114 determines that the compensation is needed.

$$N_o > N_i \quad \text{(formula 2)}$$

In other words, for the signals (that is, the signals to be referenced) at the contacts included in the ladder circuits which are updated (written) after the ladder circuits of the constituent elements (nets) to be traced are executed, the compensation determination unit 114 determines that the compensation is needed.

As another example, with reference to FIGS. 2 and 3, for example, when the user specifies the net number 1 of the program P1 as the trace target, the signal C to be referenced is updated after the signal A is updated, and thus the compensation is determined to be needed. When the net number of the main program is specified as the trace target, a signal to be referenced is updated before a signal Y is updated, and thus the compensation is determined not to be needed.

Whether or not the compensation is needed will be described with reference to FIG. 4B using a specific example. As described previously, FIG. 4B is a diagram showing the trace results of the first cycle and the second cycle in trace sampling cycles (ladder program execution cycles). The ladder program and the net to be traced shown in FIG. 4B are the same as shown in FIG. 4A. As described in FIG. 4A, the signal at the contact A is updated by the net of the net number 10 before the net (number 100) to be traced is executed, and thus it is determined that the signal at the contact A is not need to be compensated for. By contrast, the signal at the contact B is updated by the net of the net number 151 after the net (number 100) to be traced is executed, and thus it is determined that the signal at the contact B needs to be compensated for.

[Output Unit 115]

The output unit 115 may chronologically output, for example, to the display unit 140, a trace result including the states of all signals included in the ladder circuits of the constituent elements (nets) to be traced in the trace sampling cycles (ladder program execution cycles). In the following description, the table which is chronologically output in the trace sampling cycles (ladder program execution cycles) is referred to as a trace graph. More specifically, the trace graph includes the ladder circuits in which the signals (reference signals) at the individual contacts that are present in the ladder circuits of the constituent elements (nets) to be traced and that are referenced are updated (written). FIG. 4C shows an example of a trace graph which is output chronologically (the first and second cycles) in the trace sampling cycles (ladder program execution cycles) when the net of the net number 100 in the ladder program shown in FIG. 4A is set to the trace target. With reference to the trace graph shown in FIG. 4C, for example, when the user specifies the net number 100 as the trace target, the trace graph includes, in addition to the signals A, B and C, a signal X present in the net number 10 which updates the signal A and a signal Y present in the net of the net number 151 which updates the signal B.

Figure 4E:
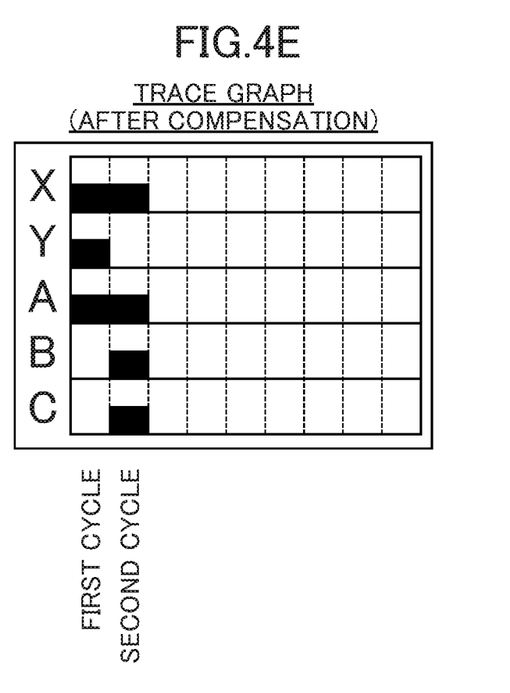
Figure 4F:
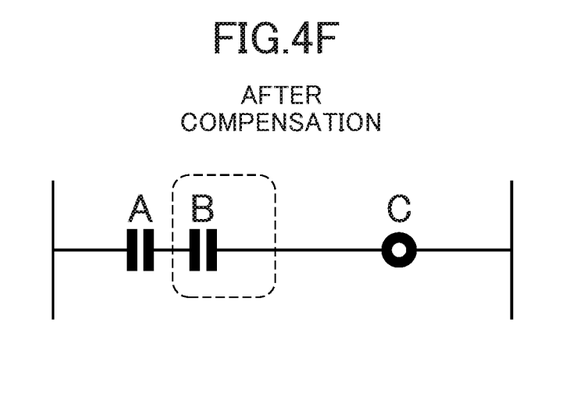
FIG. 4F is a diagram showing an example of a ladder diagram after the compensation of the net to be traced.

The output unit 115 outputs the ladder diagram of the net to be traced in the specified trace sampling cycle (ladder program execution cycle). Here, for example, when the display unit 140 is a touch panel, the specification of the trace sampling cycle may be performed by setting a cursor in a cycle on the trace graph output to the display unit 140. A cycle number may be input through the input unit 130 by the user. For the output of the ladder diagram, the output unit 115 outputs the ladder diagram in which signals (reference signals) at contacts that are determined by the compensation determination unit 114 to be needed to be compensated for, that are included in the ladder circuits of the constituent elements (nets) to be traced and that are referenced are compensated for based on a trace result in an execution cycle immediately preceding the present execution cycle. FIG. 4D shows a ladder diagram before being compensated for, and FIG. 4F shows a ladder diagram after being compensated for. When the compensation determination unit 114 determines that the compensation is needed, the output unit 115 outputs, as shown in FIG. 4F, the ladder diagram in which the state of the signal B is compensated for based on the trace result in the execution cycle immediately preceding the present execution cycle. Although in the above description, the case where one ladder diagram is output from the output unit 115 is illustrated, there is no limitation to this case. When a plurality of constituent elements (nets) to be traced are specified, the ladder diagrams of the ladder circuits of the individual constituent elements (nets) are output.

When one of the ladder diagrams displayed on the display unit 140 is specified, the output unit 115 may output a trace graph immediately after the net of the specified ladder diagram is executed. FIG. 4E shows an example where a trace graph immediately after the net 100 is executed in the execution cycle (second cycle) of the ladder program which is compensated for is displayed.

The output unit 115 can output the ladder diagram and the trace graph described above to an arbitrary device. For example, the output unit 115 may output the ladder diagram and the trace graph described above to a file. The output unit 115 may also output the ladder diagram and the trace graph described above, for example, to a smartphone, a tablet terminal or a terminal of a PC or the like (not shown) which is connected so as to be able to communicate with the output unit 115. This may be practiced by a Web technology which is known to a person skilled in the art. The embodiments of the individual function units of the tracing system 1000 in the present embodiment have been described above based on the configurations of the tracing apparatus 100 and the PLC 400.

Figure 5A:
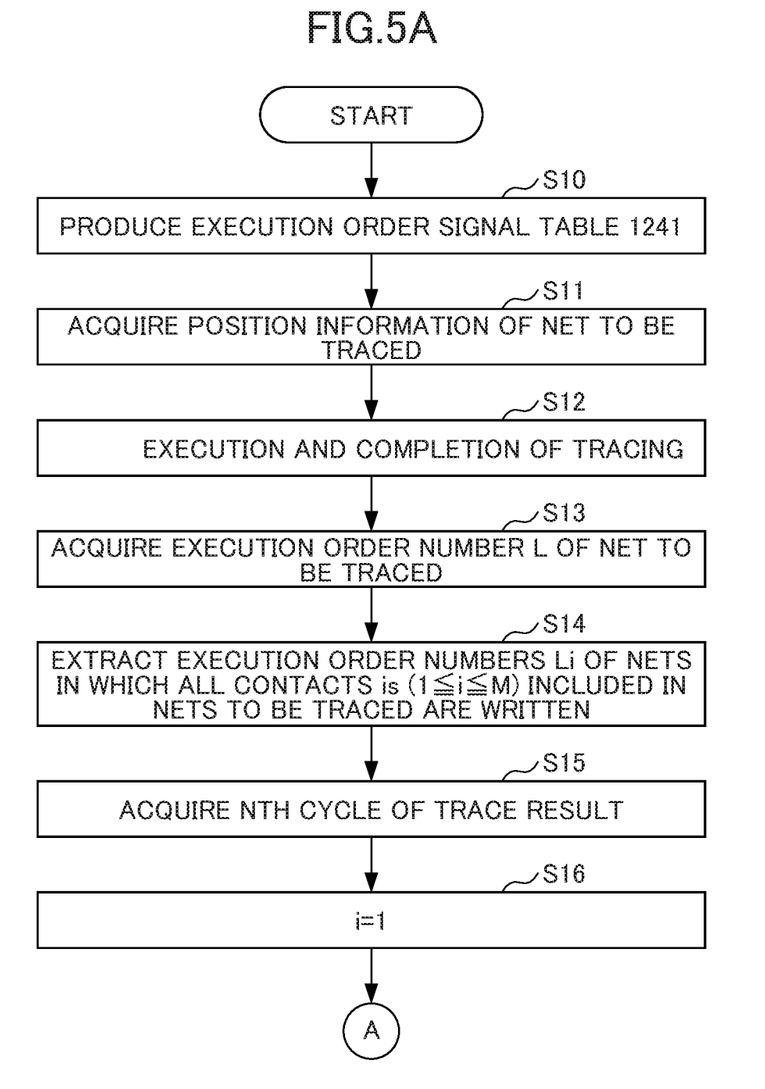
FIG. 5A is a flowchart showing trace processing which is performed by the tracing apparatus of the present embodiment.
Figure 5B:
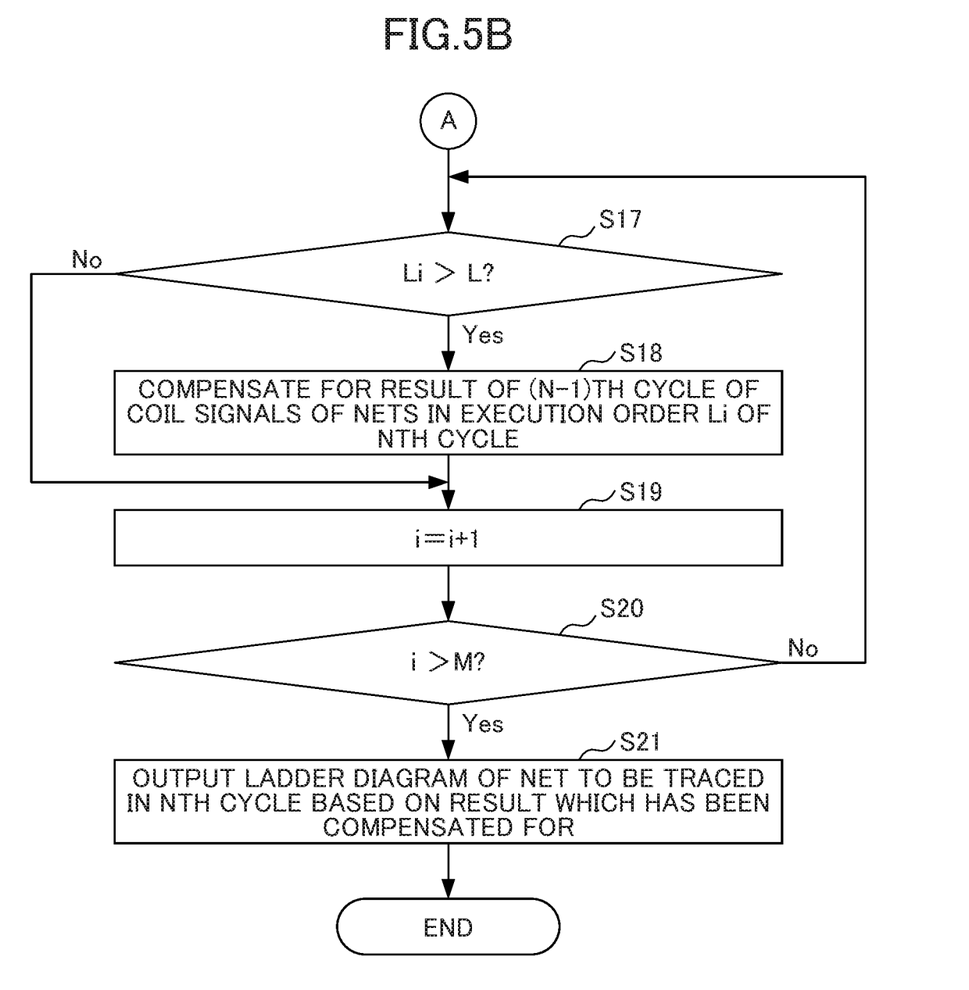
FIG. 5B is a flowchart showing the trace processing which is performed by the tracing apparatus of the present embodiment.

The operation of the present embodiment will then be described with reference to the flowcharts of FIGS. 5A and 5B. FIGS. 5A and 5B are the flowcharts showing an operation which is performed by the ladder program analysis unit 111, the trace target setting unit 112, the trace data acquisition unit 113, the compensation determination unit 114 and the output unit 115 in the tracing apparatus 100 and which displays a ladder diagram immediately after a specified net is executed in a specified trace sampling cycle. Although for ease of description, the number of nets to be traced is set to one, when a plurality of nets are set, for example, individual nets in steps S13 to S21 are preferably executed. The flowcharts shown in FIGS. 5A and 5B are an example, and there is no limitation to this configuration.

With reference to FIG. 5A, in step S10, the tracing apparatus 100 (the ladder program analysis unit 111) analyzes the ladder program so as to produce the execution order signal table 1241, and stores it in the table storage unit 124. In step S11, the tracing apparatus 100 (the trace target setting unit 112) acquires the position information of the net to be traced through, for example, the input unit 130. In step S12, the tracing apparatus 100 (the trace data acquisition unit 113) makes the PLC execute the ladder program so as to acquire the trace data in each of the trace sampling cycles, and stores it in the trace data storage unit 123.

In step S13, the tracing apparatus 100 (the compensation determination unit 114) references the execution order signal table 1241 so as to acquire the execution order number L of the net to be traced. In step S14, the tracing apparatus 100 (the compensation determination unit 114) references the execution order signal table 1241 so as to extract, for signals (reference signals) at all contacts is that are included in the nets to be traced and that are referenced, the execution order numbers Li (1≤i≤M) of the nets in which the reference signals are written (updated).

In step S15, the tracing apparatus 100 (the output unit 115) acquires, for example, through the input unit 130, the Nth cycle of the trace result which is selected by the user and which is to be compensated for. In step S16, the tracing apparatus 100 (the compensation determination unit 114) makes such a setting that i=1.

With reference to FIG. 5B, in step S17, the tracing apparatus 100 (the compensation determination unit 114) determines whether or not Li>L. When Li>L (when the determination is yes), the process is transferred to step S18. When Li<L (when the determination is no), the process is transferred to step S19. In step S18, the tracing apparatus 100 (the compensation determination unit 114) compensates for the coil signal of the net in the execution order Li of the Nth cycle with the trace result of the (N−1) th cycle, and stores it in the storage unit 120.

In step S19, the tracing apparatus 100 (the compensation determination unit 114) makes such a setting that i=i+1. In step S20, the tracing apparatus 100 (the compensation determination unit 114) determines whether or not i>M. When i>M (when the determination is yes), the process is transferred to step S21. When i≤M (when the determination is no), the process is transferred to step S17.

In step S21, the tracing apparatus 100 (the output unit 115) outputs, based on the trace result which has been compensated for, the ladder diagram of the net in the trace sampling cycle N.

Then, a specific example where the trace result is displayed as the ladder diagram and the trace graph will be described.

Specific Example 1

In a Case Where the Ladder Diagram Does Not Need to be Compensated for

Figure 6A:
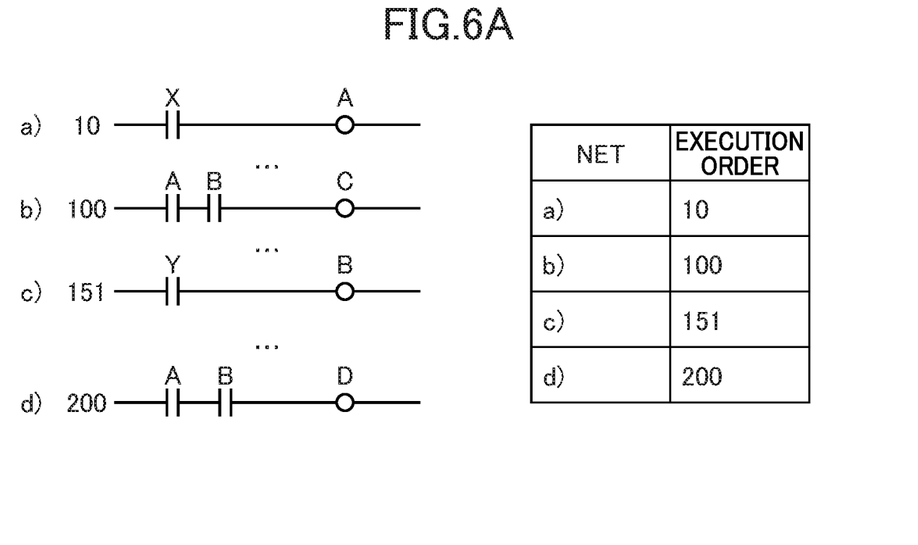
FIG. 6A is a diagram showing an example of the position information (net numbers) and the execution order numbers of nets.
Figure 6B:
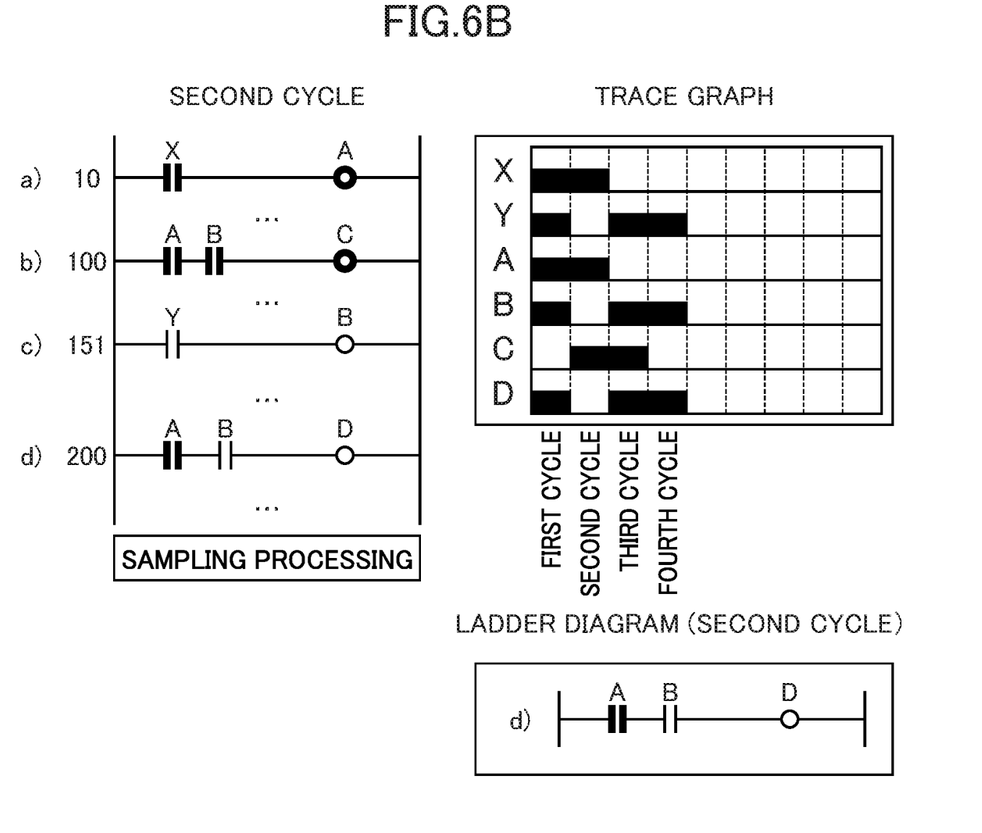
FIG. 6B is a diagram showing an example where a ladder diagram and a trace graph which do not need to be compensated for are displayed.

Although in FIGS. 4A to 4F described above, the specific example where the compensation is needed is described according to the execution order numbers of the ladder circuits of the constituent elements (nets) to be traced, an example where the compensation is not needed will be described here. FIG. 6A is a diagram showing an example of the position information (net numbers) and the execution order numbers of the nets. FIG. 6B is a diagram showing an example where the ladder diagram and the trace graph of the net number 200 (d) which do not need to be compensated for are displayed. As is clear from FIGS. 6A and 6B, the contacts A and B of the net number 200 (d) are updated before the execution of the net number 200 (d). Hence, when the output unit 115 displays the ladder diagram and the trace graph of the net number 200 (d) are displayed, the output unit 115 does not need to compensate for the ladder diagram and the trace graph.

Then, a specific example where the trace graph immediately after the ladder circuit of the selected net is executed (compensated for) is displayed will be described.

Specific Example 2

Figure 6C:
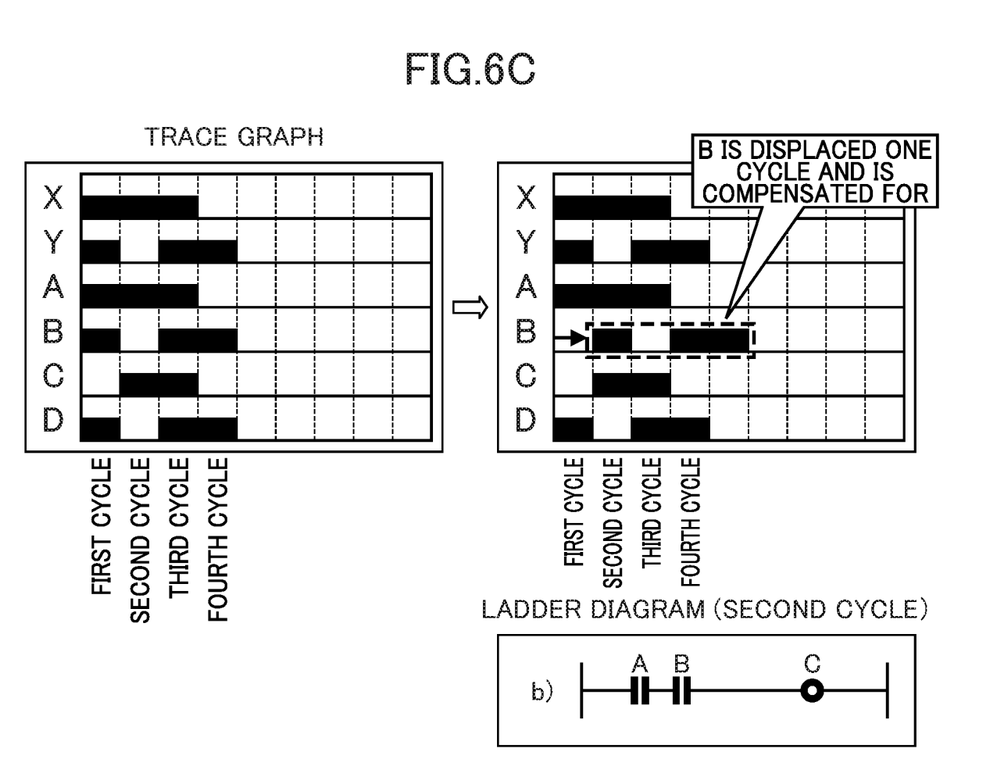
FIG. 6C is a diagram showing an example where a ladder diagram and a trace graph which have been compensated for with the tracing apparatus of the present embodiment are displayed.

FIG. 6C is a diagram showing an example where the ladder diagram and the trace graph of the net number 100 (b) are displayed. As is clear from FIGS. 6A and 6B, the signal at the contact B is updated by the net of the net number 151. Hence, as shown in FIG. 6C, when the output unit 115 displays the ladder diagram and the trace graph of the net number 100 (b), the output unit 115 compensates for the ladder diagram and the trace graph.

In this way, even in a case where on all the signals included in the ladder circuits of the constituent elements (nets or coils) to be traced, the signal (reference signal) at the contact to be referenced is written, after the execution of the ladder circuit thereof, by a subsequent separate ladder circuit, when the ladder diagram of the ladder circuit in the trace sampling cycle is displayed, the signal (reference signal) at the contact can be compensated for with the trace result in the cycle immediately preceding the sampling cycle. Thus, it is possible to check the signal state immediately after the ladder diagram is executed. Moreover, it is not necessary to analyze a complicated ladder, and thus the efficiency of debugging is enhanced.

In addition to the ladder diagram which has been compensated for, the output unit 115 can output the trace graph of the net which has been compensated for. In this way, it is possible to check the state of the associated signals immediately after the ladder circuit is executed, and thus the efficiency of debugging is enhanced.

The output unit 115 can output the trace result to the display unit 140 according to a chronological manner including the execution cycle specified by the user. In this way, it is possible to chronologically check the states of the signals in the ladder circuits. It is possible to check the states immediately before and after the net is executed, and thus the efficiency of debugging is enhanced.

Programs including operating programs used in the present invention can be stored with various types of non-transitory computer readable media and supplied to a computer. The non-transitory computer readable media include various types of tangible recording media (tangible storage media). Examples of the non-transitory computer readable medium include magnetic recording media (for example, a flexible disk, a magnetic tape and a hard disk drive), magneto-optical recording media (for example, a magneto-optical disk), a CD-ROM (Read Only Memory), a CD-R, a CD-RWORKPIECE and semiconductor memories (for example, a mask ROM, a PROM (Programmable ROM), an EPROM (Erasable PROM), a flash ROM and a RAM (random access memory)). The programs may also be supplied to a computer with various types of transitory computer readable media. Examples of the transitory computer readable medium include electric signals, optical signals and electromagnetic waves. The transitory computer readable media can supply programs to a computer through a wired communication path such as an electrical wire or an optical fiber or a wireless communication path.

The embodiment described above is a preferred embodiment of the present invention but the scope of the present invention is not limited to only the embodiment described above, and various modifications can be made without departing from the spirit of the present invention so as to be practiced.

<Variation 1>

Although in the embodiment described above, as the constituent element, the net is illustrated, the coil may be included as the constituent element. Although the trace target setting unit 112 specifies, as the trace target, one or more pieces of position information of the net included in the ladder program so as to set the trace target, there is no limitation to this configuration. As described above, the trace target setting unit 112 may specify the coil as the trace target. In such a case, the trace target setting unit 112 can reference, for example, the execution order signal table 1241 so as to identify the position information of the net where the coil is present.

<Variation 2>

Although in the embodiment described above, as the tracing apparatus 100, the personal computer (PC) or the server device is illustrated, the PLC may include the tracing apparatus 100. A numerical controller (not shown) may include the tracing apparatus 100

A numerical controller (not shown) may include the PLC 400.

<Variation 3>

Although in the embodiment described above, as the sequence control program, the ladder-type program is illustrated, there is no limitation to this configuration. Another sequence control program of an SFC (Sequential Function Chart) type or the like may be used.

EXPLANATION OF REFERENCE NUMERALS

100 tracing apparatus
110 control unit
111 ladder program analysis unit
112 trace target setting unit
113 trace data acquisition unit
114 compensation determination unit
115 output unit
120 storage unit
122 constituent element storage unit
123 trace data storage unit
124 table storage unit
1241 execution order signal table
130 input unit
140 display unit
400 PLC
1000 tracing system

What is claimed is:

1. A tracing apparatus which is connected to a programmable controller for executing a ladder program including a plurality of ladder circuits so as to be able to communicate therewith and enhance debugging of the ladder circuits, the tracing apparatus comprising:
   a programmable controller configured to execute a program to:

set one or more constituent elements to be traced when the ladder program is executed;

analyze an order in which the ladder circuits are executed;

output a ladder diagram of the ladder circuits of the constituent elements to be traced in a specified execution cycle of the ladder program; and determine, based on an execution order in which the ladder circuits of the constituent elements to be traced are executed and an execution order in which states of signals at contacts included in the ladder circuits are updated, whether the state of the signal at the contact included in the ladder circuit needs to be compensated for, and when it is determined that the state of the signal at the contact included in the ladder circuit needs to be compensated for, output the ladder diagram in which the state of the signal at the contact included in the ladder circuit is compensated for, based on a trace result in an execution cycle immediately preceding the execution cycle, in order to check the signal state immediately after the ladder diagram is output and debug the ladder circuit.

2. The tracing apparatus according to claim 1, wherein the hardware controller is further configured to chronologically output a trace result including states of all signals included in the ladder circuits of the constituent elements to be traced in the execution cycle of the ladder program.

3. The tracing apparatus according to claim 1, wherein the hardware controller is configured to output to a display.

4. The tracing apparatus according to claim 3, wherein the hardware controller is configured to output, to the display, the ladder diagram of the ladder circuits of the constituent elements to be traced in the specified execution cycle of the ladder program.

5. A programmable controller comprising the tracing apparatus according to claim 1.

* * * * *